M. SROKE.
WIRE CUTTING BAYONET FOR FIREARMS.
APPLICATION FILED MAR. 20, 1918.

1,269,126.

Patented June 11, 1918.

Inventor
M. Sroke

By
Attorney

UNITED STATES PATENT OFFICE.

MIKE SROKE, OF LACKAWANNA, NEW YORK.

WIRE-CUTTING BAYONET FOR FIREARMS.

1,269,126.  Specification of Letters Patent.  Patented June 11, 1918.

Application filed March 20, 1918. Serial No. 223,499.

*To all whom it may concern:*

Be it known that I, MIKE SROKE, a subject of the Emperor of Austria, residing at Lackawanna, in the county of Erie and State of New York, have invented certain new and useful Improvements in Wire-Cutting Bayonets for Firearms, of which the following is a specification.

The primary object of the invention is the provision of a bayonet for rifles formed with wire-cutting means whereby wires may be readily severed by the soldier carrying the fire-arm, enabling him to cut his way through a barrier such as a barbed wire entanglement.

A further object of the device is the provision of a wire-cutting bayonet adapted for ready attachment upon the muzzle portion of a rifle barrel and normally positioned out of the way, but readily shifted for cutting wires when desired for use.

A still further object of the device is to provide a wire-cutting bayonet that is easy and inexpensive to manufacture and one that possesses great strength, and while including the wire-cutting features does not in any manner limit its ordinary use as a bayonet.

In the drawing forming a part of this application and in which like numerals refer to corresponding parts throughout the several views:—

Figure 1:
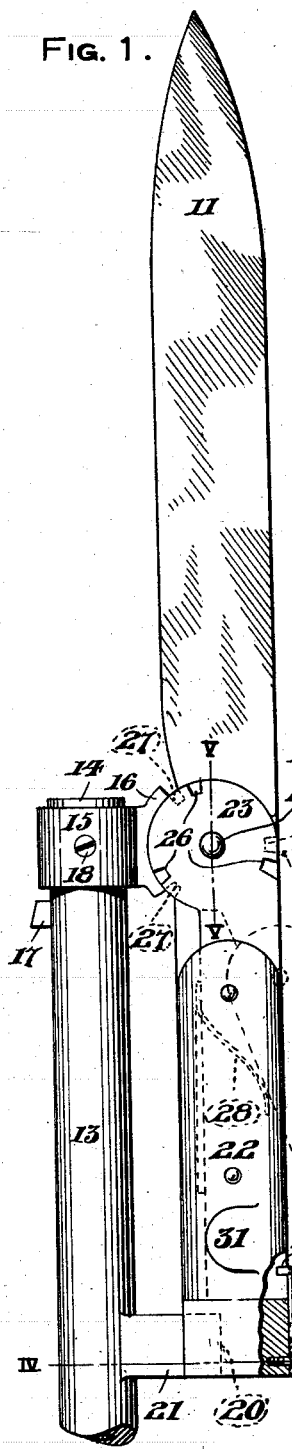
Figure 1 is a side elevation of the device operatively mounted upon a rifle barrel, the wire-cutting member being illustrated by dotted lines in its operative open position.

It will be first understood that the device broadly consists of a bayonet 10 having a blade 11 and a shank 12, being of the knife form of bayonet, and is attached upon the barrel 13 of a fire-arm with the blade 11 projecting forwardly of the plane of the muzzle 14 thereof. A collar 15 projects from an arcuate housing 16 provided at the merging point between the blade 11 and shank 12, the said collar being slidably fitted over the free end of the barrel 13 forwardly of the sight 17 that is provided upon the upper side of the barrel, and is suitably held as by set screws 18. The sliding of the collar 15 onto the barrel 13 positions a tenon 20 carried by a post 21 within a dove-tailed groove 19 provided therefor in the free end of the shank. The post 21 extends from and is carried by the lower side of the barrel 13. In this manner it will be seen that the bayonet will be firmly mounted upon the barrel although the same may be readily removed therefrom by removing the collar 15. When the bayonet 10 is so positioned upon the barrel, it is disposed therebeneath in a plane parallel to the barrel with the blade 11 projecting forwardly from the plane of the barrel muzzle 14.

Figure 2:
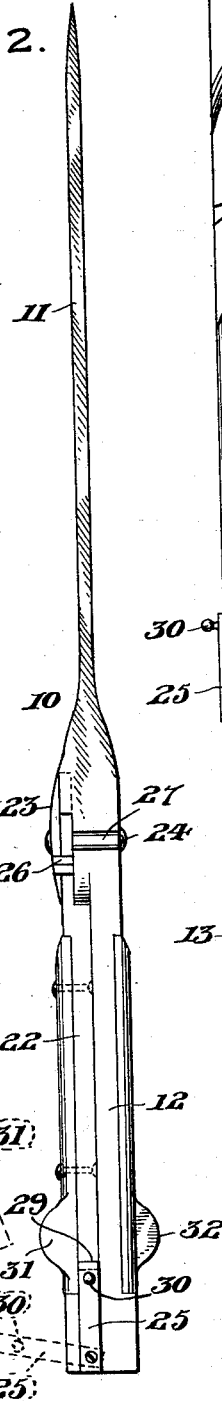
Fig. 2 is an edge elevational view of the device.
Figure 3:
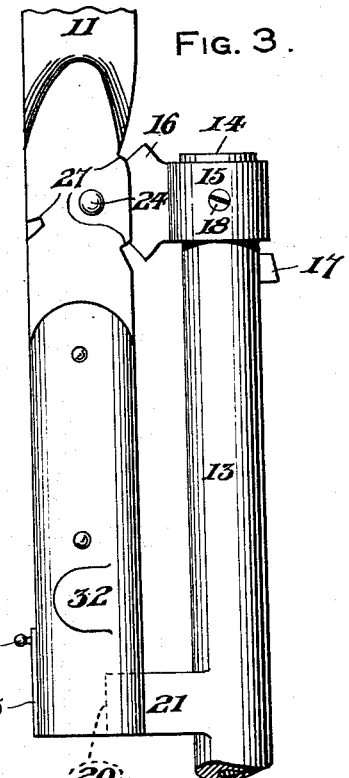
Fig. 3 is a side elevation of a portion of the same taken from the side opposite that shown in Fig. 1.
Figure 4:
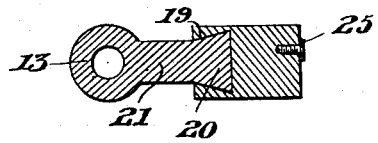
Fig. 4 is a transverse sectional detail view taken upon line 4—4 of Fig. 1.
Figure 5:
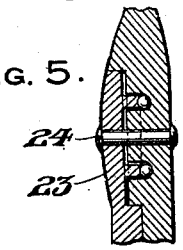
Fig. 5 is a similar sectional view taken upon line 5—5 of Fig. 1.

The shank 12 has a wire-cutting section 22 provided with a circular head 23 pivotally mounted upon the arcuate portion 16 of the bayonet by means of a transversely positioned pin 24, a swinging retaining latch 25 being carried by the shank 12 for normally maintaining the section 22 in its closed position as shown in Figs. 1 and 2 of the drawing.

The head 23 is formed with marginal wire-receiving notches 26 therein adapted to aline with similar notches 27 in the mounting portion 16 of the shank 12, it being understood that the opposite sides of the said notches are suitably sharpened for readily severing wires when positioned within adjacently arranged ones of said notches 26 and 27 upon shifting the section 22 upon its pivot 24. A leaf-spring 28 is arranged beneath the section 22, it being understood that the notches 26 are normally out of registry with the notches 27 when the section 22 is closed with the latch 25 engaging the slot 29 adjacent the free end of said section.

The latch 25 being resilient, the handle 30 thereof may be grasped for unseating the latch from the slot 19 and laterally swinging the latch clear of the section 22 as illustrated by dotted lines in Fig. 2 of the drawing, whereupon the spring 28 will automatically open the section 22 bearing the cutting notches 26 into alinement with the corresponding notches 27 of the shank. In this manner, wire-receiving cutters are provided at both sides of the blade 11 adjacent the inner end thereof so that the blade may be readily positioned upon the wire and slidably moved until the wire seats within a set of the cutting notches and the soldier then grasps the section 22 and closes the same for severing the wire. Lugs 31 and 32 are carried by the section 22 and the opposite side of the shank 12 respectively for convenience in opening and closing the shiftable section 22 thereof. One set of cutting notches 26 and 27 will be disposed between the post 21 and collar 15 when the bayonet is mounted upon the barrel 13 which are capable of employment along with the other sets of cutting notches for cutting wires when the bayonet is detached from the rifle.

A serviceable wire-cutter is provided which may be employed when the bayonet 10 is removed from the barrel 13 and the bayonet used as a knife although the bayonet is adapted for ready attachment upon a barrel such as 13 for employment in cutting wires when so arranged.

What I claim as new is:—

1. In combination with a rifle barrel, a projecting post carried thereby having a flaring tenon-shaped end, a bayonet having a blade and shank and a connecting portion therebetween with a dove-tailed groove at the free end of the shank adapted for slidably mounting upon said tenon end, a collar projecting from said connecting portion mounted upon the barrel when the device is arranged for use, the said connecting portion having a plurality of open cutting notches therein, and a shiftable section provided with a head pivoted to the said connecting portion arranged with edge notches adapted for registering with the said cutting notches for the reception of wires to be cut by the device.

2. In combination with a rifle barrel, a projecting post carried thereby having a flaring tenon-shaped end, a bayonet having a blade and shank and a connecting portion therebetween with a dove-tailed groove at the free end of the shank adapted for slidably mounting upon said tenon end, a collar projecting from said connecting portion mounted upon the barrel when the device is arranged for use, the said connecting portion having a plurality of open cutting notches therein, a shiftable section provided with a head pivoted to the said connecting portion arranged with edge notches adapted for registering with the said cutting notches for the reception of wires to be cut by the device, a swinging resilient latch carried by said shank adapted for overlying the said section when closed, an opening spring for the said section when the latch is released, and finger-engaging lugs oppositely arranged upon the outer sides of the said section and shank.

In testimony whereof I affix my signature.

MIKE SROKE.